Aug. 15, 1944.   A. B. ANDERSEN ET AL   2,356,024
METHOD OF AGGLOMERATING
Filed May 28, 1943
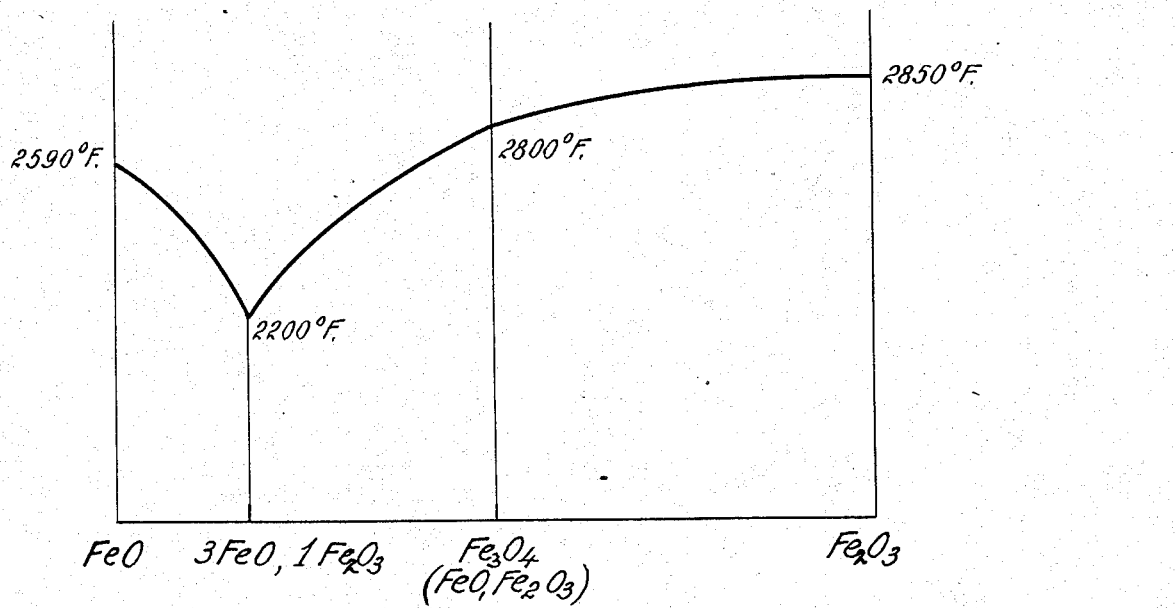
INVENTORS
Axel Brix Andersen
Knud Horn
BY Pennie Davis Marvin Edmonds
ATTORNEYS Patented Aug. 15, 1944

2,356,024

UNITED STATES PATENT OFFICE 2,356,024

METHOD OF AGGLOMERATING

Axel Brix Andersen, New Rochelle, and Knud Horn, New York, N. Y., assignors to F. L. Smidth & Co., New York, N. Y., a corporation of New Jersey Application May 28, 1943, Serial No. 488,852

11 Claims. (Cl. 75—5)

This invention relates to the treatment of finely divided iron-bearing materials, of which iron ore fines and blast furnace flue dust are typical examples, for the purpose of forming such materials into small lumps or nodules which can be readily handled in blast furnaces, open hearth furnaces, or other furnaces. More particularly, the invention is concerned with a novel process for agglomerating such iron-bearing materials, which can be practiced at low cost and employed for the formation of nodules that are strong and either dense or porous, as desired.

The raw materials used in the production of iron are frequently in such finely divided condition that they cannot be charged into a furnace, such as a blast furnace, without a preliminary treatment to form the fine grains or powdery material into lumps. Such iron-bearing materials include certain iron ores in their natural state, as well as ore that has been beneficiated, blast furnace flue dust, the residue of iron pyrites after the sulphur has been burned off, and various by-products rich in iron.

Heretofore such finely divided materials have commonly been prepared for furnace treatment by sintering either in rotary kilns or grate type sintering machines and, while these types of apparatus differ mechanically, they are similar in function in that they heat all of the material to be sintered to a temperature at which incipient fusion takes place, and the material is thereby bound together in small lumps. The sintered product, referred to ordinarily as "sinter," is generally used for the open hearth furnace and the blast furnace, and the properties of the sinter required for the two different furnaces are different. Thus, for open hearth operations, sinter of high density is required because the sinter is introduced at the top of the slag burden of the furnace and the density of the sinter must, therefore, be such as to enable it to gravitate to the molten material. In blast furnace practice, a sinter of high porosity is desired in order that the reducing gases can react on a large surface area and thereby accomplish a quick reduction of the raw material. Regardless of the nature of the sinter, the sintering operation involves considerable expense because the materials being treated must be raised almost to their melting point, which is relatively high and usually about 2500° F. of higher.

The present invention is directed to the provision of a method by which finely divided iron-bearing materials, such as iron ore fines and blast furnace flue dust, can be agglomerated into strong lumps or nodules which may be either dense or porous, as desired, at a cost much less than that of sintering as heretofore practiced. In carrying out the new method, use is made of an agglomerating agent which is composed of a mixture of iron oxides and has a melting point substantially lower than the sintering temperature of its constituents. The agglomerating agent used consists of a mixture of ferric and ferrous oxides and these oxides may be derived from various materials by suitable methods to be explained. The agglomerating agent may be employed in a number of different ways to effect agglomeration of the finely divided iron-bearing materials to be treated and, since the agglomerating agent consists primarily of iron oxides, its presence as part of the nodules in no way interferes with their use for their intended purpose.

For a better understanding of the invention, reference may be made to the accompanying drawing in which the single figure is a chart illustrating the melting points of iron oxide mixtures of varying composition.

The agglomerating agent employed in the new method is a mixture of ferrous and ferric oxides of such a composition that the mixture has a relatively low melting point and passes directly from the solid to the liquid state. The curve A on the drawing shows the melting points of various mixtures of iron oxides and, on the curve, it will be observed that ferric oxide, $Fe_2O_3$, melts at a temperature of about 2850° F., and ferrous oxide, $FeO$, melts at a temperature of about 2590° F. Ferrosoferric oxide $Fe_3O_4$, which may be regarded as a compound consisting of 1 molecule of $FeO$ and 1 molecule of $Fe_2O_3$, melts at about 2800° F. Starting with the equimolecular proportions of $FeO$ and $Fe_2O_3$ in the oxide $Fe_3O_4$, the melting point of a mixture of ferrous and ferric oxides falls as the proportion of $FeO$ increases, until a mixture, which may be represented as $3FeO \cdot 1Fe_2O_3$, is reached. This mixture has the lowest melting point, namely, about 2200° F., of any of the combinations of $FeO$ and $Fe_2O_3$ and it is such a low melting point mixture of iron oxides that is employed as the agglomerating agent in the process of the invention.

The agglomerating agent mentioned may be made in various ways and the simplest and most convenient method, of which we are now aware, involves heating a mixture of iron oxides and carbonaceous materials under such conditions that the carbonaceous materials are burned and the oxides are reduced. The iron oxides may be derived from any suitable source and, as the iron-bearing materials to be treated ordinarily contain such oxides, those materials may be employed in forming the agent. Various carbonaceous materials may be used and bituminous coal is an example of such a material that may be advantageously employed as the reducing agent. The amount of carbonaceous materials employed depends on the composition of the iron oxides to be reduced and may be determined by calculation.

Theoretically, it is possible to prepare a mixture of iron oxides and carbonaceous materials in proper proportions, so that, by burning of the carbonaceous materials, a sufficient proportion of the iron oxides can be reduced to produce the desired low melting point agglomerating agent. Such an agent could then be used with the iron-bearing materials to form a charge in which, upon heating, the agent would become molten and bind the iron-bearing materials into nodules. However, the close control of the operation required would make it difficult, under practical conditions, to prepare the agglomerating agent in advance, and it is, therefore, preferable, to carry on the operations under such conditions that the agglomerating agent is formed and used for agglomerating purposes immediately upon its formation. For this purpose, a mixture of iron oxides, in the form, for example, of the iron-bearing materials to be treated, and bituminous coal, is reduced to finely divided condition by grinding, for example, until 90% of the mixture passes a 200 mesh screen. A quantity of this mixture is then mixed with the iron-bearing materials to be agglomerated to form a charge. Upon heating of the charge under proper conditions, the coal is burned, reduction of the finely divided iron oxides begins, and, when the reduction has continued until the finely divided oxides contain FeO and Fe2O3 in the proportions of 3 to 1, the finely divided material melts to form the agglomerating agent which at once begins to cause agglomeration of the remainder of the charge. If an excess of carbonaceous material is present, so that the reduction continues further than is necessary to produce the low melting point mixture, the proportions of the oxides present in the agent are altered so as to produce a mixture of higher melting point, as indicated by the upward slope of curve A to the left of the lowest point thereon. As the temperature at which the operation is carried on is kept at about 2200° F. to 2300° F., the raising of the melting point of the agent, which has bound the material to be treated into nodules, is in effect equivalent to cooling the original agent, and the nodules are, accordingly, hardened and becomes stronger.

The finely-ground particles of the carbonaceous material will, of course, not only react with the finely-ground iron-bearing materials forming one of the constituents of the agglomerating agent, but also on the iron-bearing materials to be treated and forming the major portion of the whole charge. The reduction of the iron oxides by carbonaceous material as taking place in this process is a reaction between solid particles and as such it is a surface action. The finely-ground iron-oxide particles forming one of the constituents of the agglomerating agent present a much larger surface to the finely-ground carbonaceous particles than do the iron-bearing materials to be treated. This difference in surface area presented may range from, say, ten to five hundred or more times, depending upon the fineness of the iron-bearing materials to be treated. As the finely-ground iron oxides forming one of the constituents of the agglomerating agent present this tremendously larger surface to the carbonaceous particles, the process between these two will be practically complete, while the reaction between the particles of the carbonaceous material and the comparatively coarse charge of iron-bearing materials to be treated will, so long as no extraordinarily excessive amount of carbon is used, be so limited that it does not upset the balance between the various amounts of oxides created by the reaction between the finely-divided particles from which the agglomerating agent is formed.

In the foregoing it has been explained that the constituents of the agglomerating agent are made by grinding together a mixture of carbonaceous material and iron-bearing materials to a fineness of 90% passing through a 200-mesh sieve. In certain cases the iron-bearing materials to be treated may contain an adequate amount of inherent fines, so that no further grinding of the iron-bearing materials forming one of the constituents of the agglomerating agent is necessary. If this is the case, only the desired amount of carbonaceous material should be ground to the desired fineness and thereafter be mixed with the iron-bearing materials to be treated. The finely-ground carbonaceous material together with the inherent fines in the iron-bearing materials to be treated will then form the constituents for the agglomerating agent.

In the production of an agglomerating agent by the use of iron ore containing iron in the form of Fe2O3, the minimum theoretical amount of carbon required to produce the agent can be calculated from the following equation:

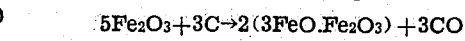

$$5Fe_2O_3 + 3C \rightarrow 2(3FeO.Fe_2O_3) + 3CO$$

Calculation shows that the amount of carbon required is 4.3% of the total mixture from which the agent is derived. The necessary amount of carbonaceous material to provide this quantity of carbon can then be calculated on the basis of the carbon content of such material. If, for instance, coal having a carbon content of 80% is employed, the theoretical minimum amount of such coal required will be 5.4%.

In the actual practice of the process, it is not possible to avoid a certain amount of the carbon being burned away without having any reducing effect on the iron oxides and also, a minor proportion of the carbon particles will react with the iron-bearing material to be treated, as above explained. For these reasons, an excess of carbonaceous material should be employed and our tests have shown that good nodules can be obtained by employing 6.4% of carbon in the mixture from which the agglomerating agent is produced.

In carrying out the process in the treatment, for example, of an ore containing iron in the form of Fe2O3, a quantity of ore, together with bituminous coal in proper amount, as, for instance, about 8% by weight of the ore, is ground to a fineness such that about 90% of the mixture will pass a 200 mesh screen. This mixture is then added to the iron-bearing materials to be treated to form a charge containing an amount of the mixture varying from about 10% to about 50% by weight of the ore to be treated. The amount of agent used depends on the type of nodules desired and, in general, it may be said that the density of the nodules will vary directly and the porosity will vary inversely with the amount of agent employed. For most purposes, the amount of the agent-producing mixture that is used will be about 15% by weight of the iron-bearing materials to be treated and will preferably not exceed 25% by weight of the iron-bearing materials. Any excess of the agent mixture above 25% will be merely for the purpose of recovering iron values in the material used to produce the agent, which might otherwise be lost.

The charge may be heated either in a rotary kiln or a grate type sintering machine, but the kiln is preferred because of the agitation to which the charge is subjected. In the kiln, the charge is heated to a maximum temperature of about 2200° F. to 2300° F. and, during the passage of the charge down through the kiln, the burning of the coal causes reduction of the iron oxides in the agglomerating agent mixture. When the composition of the mixture corresponds to $$3FeO.1Fe_2O_3$$

the mixture is of relatively low melting point and the mixture melts and forms the molten agent at the hot point in the kiln. As soon as the agent becomes molten, agglomeration will take place and, as the nodules pass on farther down the kiln, they become hard and are discharged in a condition which permits them to be handled without damage.

Tests of the new method with varying amounts of carbon in the mixture from which the agent is produced have shown that good nodules can be made by employing an amount of the agent equal to about 15% by weight of the total charge, with the agent derived from mixtures containing 6.4% carbon, 12.8% carbon, and 40% carbon. Good nodules have also been made in a test in which the charge contained 30 of the agglomerating mixture, with the latter containing 6.4% carbon. In all such tests, the nodulization took place at a temperature between 2200° F. and 2300° F. and the tests showed clearly that the more carbon present in the agglomerating agent mixture, the denser the nodules that were produced.

It will be seen that in the practice of the new method, the charge to be agglomerated need not be heated substantially above the melting point of the agglomerating agent, namely, about 2200° F., and this represents a substantial saving in cost when compared with ordinary sintering operations in which the material to be sintered has to be raised to the much higher temperature of incipient fusion thereof. The new method has the further advantage that by varying the proportions of the agent employed for sintering purposes, the nodules may be made dense and suitable for open hearth furnace use or porous, as preferred for blast furnace use. As the iron-bearing materials to be treated may ordinarily be employed as the source of the iron oxides used in forming the agglomerating agent, the practice of the process is simple and inexpensive in that no additional materials, other than coal, are required for the formation of the agent. As only a relatively small part of the charge to be treated must be ground to prepare the mixture from which the agent is derived and the iron-bearing materials to be treated are relatively fine, the cost of grinding the mixture employed for the agent is low and does not decrease the net saving afforded by the use of the process to any considerable extent.

We claim:

1. A method of agglomerating iron-bearing materials, which comprises preparing a charge made up of said materials and a mixture of finely divided iron oxide and solid carbonaceous materials capable, upon being heated, of producing an agglomerating agent in the form of a mixture of iron oxides of substantially lower melting point than the iron-bearing materials, the materials employed to produce the agent being much more finely divided than the iron-bearing materials, and heating the charge to form and melt the agent.

2. A method of agglomerating iron-bearing materials, which comprises preparing a charge made up of said materials and an agglomerating agent in the from of a mixture of iron oxides much more finely divided than the iron-bearing materials, the mixture having a melting point substantially lower than that of the iron-bearing materials, and heating the charge to melt the agent.

3. A method of agglomerating iron-bearing materials, which comprises preparing a charge made up of said materials and a mixture of iron oxide and a quantity of solid carbonaceous material not substantially greater than is required, upon its combustion in the presence of the iron oxide, to reduce the latter to a mixture of iron oxides of substantially lower melting point than the iron-bearing materials and suitable for use as an agglomerating agent, the constituents of the mixture being much more finely divided than the iron-bearing materials, and heating the charge until the carbonaceous material is consumed and the agent has been produced in molten form.

4. A method of agglomerating iron-bearing materials, which comprises preparing a finely divided mixture of iron oxide and solid carbonaceous materials in approximately such proportions that, upon combustion of the carbonaceous material, a mixture of iron oxides of substantially lower melting point than the iron-bearing materials and suitable for use as an agglomerating agent will be produced, the constituents of the original mixture being much more finely divided than the iron-bearing materials, preparing a charge made up of a major proportion of iron-bearing materials to be agglomerated and a minor proportion of said mixture, and heating the charge to consume the carbonaceous materials and form the agent and cause it to agglomerate the iron-bearing materials.

5. A method of agglomerating iron-bearing materials, which comprises preparing a finely divided mixture of iron oxide and solid carbonaceous materials in approximately such proportions that, upon combustion of the carbonaceous material, a mixture of iron oxides of substantially lower melting point than the iron-bearing materials and suitable for use as an agglomerating agent will be produced, the constituents of the original mixture being much more finely divided than the iron-bearing materials to be agglomerated, preparing a charge made up of a major proportion of iron-bearing materials to be agglomerated and a minor proportion of said mixture, and heating and agitating the charge to consume the carbonaceous materials and form and melt the agent and cause it to agglomerate the iron-bearing materials.

6. A method of agglomerating iron-bearing materials, which comprises preparing a finely divided mixture of iron oxide and solid carbonaceous materials in approximately such proportions that, upon combustion of the carbonaceous material, a mixture of iron oxides of substantially lower melting point than the iron-bearing materials and suitable for use as an agglomerating agent will be produced, the constituents of the original mixture being much more finely divided than the iron-bearing materials to be agglomerated, preparing a charge containing iron-bearing materials and sufficient of said mixture to yield an agglomerating agent in an amount varying from about 10% to about 50% by weight of the charge, and heating the charge to consume the carbonaceous materials and form and melt the agent and cause it to agglomerate the iron-bearing materials.

7. A method of agglomerating iron-bearing materials which comprises preparing a finely divided mixture of iron oxide and solid carbonaceous materials in approximately such proportions that, upon combustion of the carbonaceous material, a mixture of iron oxides of substantially lower melting point than the iron-bearing materials and suitable for use as an agglomerating agent will be produced, the constituents of the original mixture being much more finely divided than the materials to be agglomerated preparing a charge containing iron-bearing materials and sufficient of said mixture to yield an agglomerating agent in an amount varying from about 10% to about 25% by weight of the charge, and heating the charge to consume the carbonaceous matrials and form and melt the agent and cause it to agglomerate the iron-bearing materials.

8. A method of agglomerating iron-bearing materials which comprises preparing a finely divided mixture of iron oxide and solid carbonaceous materials in approximately such proportions that, upon combustion of the carbonaceous material, a mixture of iron oxides of substantially lower melting point than the materials to be agglomerated and suitable for use as an agglomerating agent will be produced, the constituents of the original mixture being much more finely divided than the materials to be agglomerated, preparing a charge containing iron-bearing materials and sufficient of said mixture to yield an agglomerating agent in an amount varying from about 10% to about 25% by weight of the charge, and heating the charge to consume the carbonaceous materials and cause formation of the agent in molten condition and simultaneously agitating the charge to cause it to be agglomerated.

9. A method of agglomerating iron-bearing materials which comprises preparing a finely divided mixture of iron oxide and solid carbonaceous materials in approximately such proportions that, upon combustion of the carbonaceous material, a mixture of iron oxides suitable for use as an agglomerating agent and of the approximate composition $3FeO.1Fe_2O_3$ is formed, the constituents of the original being much more finely divided than the materials to be agglomerated, preparing a charge of a major proportion of the iron-bearing materials to be treated and a minor proportion of said mixture, and heating the charge under such conditions that the carbonaceous material is consumed, the agglomerating agent is formed and melted, and the iron-bearing materials are agglomerated thereby.

10. A method of agglomerating iron-bearing materials which comprises preparing a finely divided mixture of iron oxide and solid carbonaceous materials in approximately such proportions that, upon combustion of the carbonaceous material, a mixture of iron oxides suitable for use as an agglomerating agent and of the approximate composition $3FeO.1Fe_2O_3$ is formed, the constituents of the original mixture being much more finely divided than the materials to be agglomerated preparing a charge of a major proportion of the iron-bearing materials to be treated and a minor proportion of said mixture, introducing the charge into a rotary kiln, and, as the charge travels down the kiln, heating the charge under such conditions that the carbonaceous material is consumed, the agglomerating agent is formed, the charge is heated to about 2200° F. to melt the agent, and the iron-bearing materials are agglomerated by the molten agent.

11. A method of agglomerating iron-bearing materials which comprises preparing a finely divided mixture of iron oxide and solid carbonaceous materials in approximately such proportions that, upon combustion of the carbonaceous material, a mixture of iron oxides of substantially lower melting point than the materials to be agglomerated and suitable for use as an agglomerating agent is formed, the constituents of said mixture being much more finely divided than the materials to be agglomerated, preparing a charge of said mixture and said iron-bearing materials, and heating the charge to a temperature of about 2200° F. to cause combustion of the carbonaceous material and formation and melting of the agglomerating agent.

AXEL BRIX ANDERSEN.
KNUD HORN.